Patented June 27, 1933

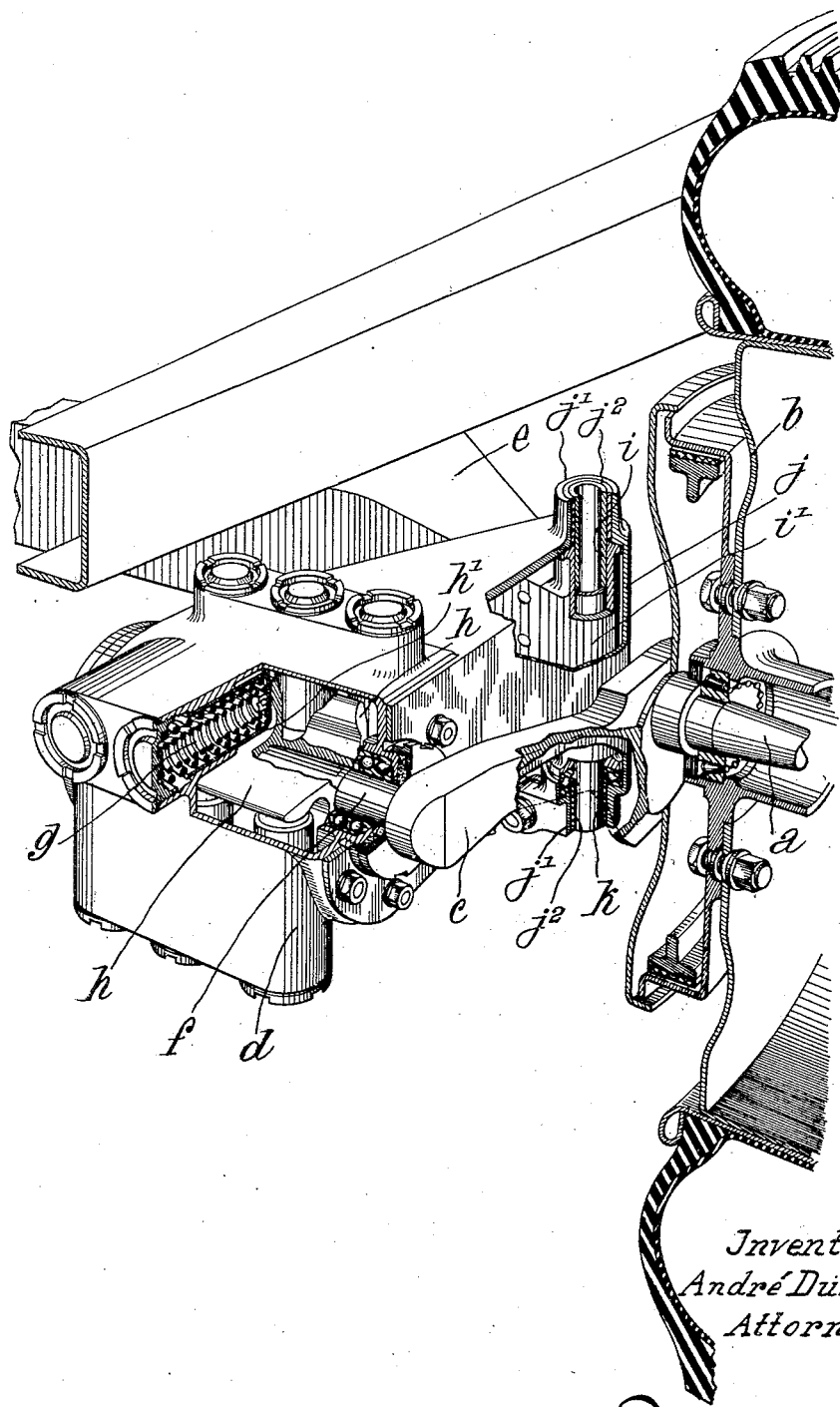

1,916,098

UNITED STATES PATENT OFFICE

ANDRÉ DUBONNET, OF NEUILLY SUR SEINE, FRANCE

INDIVIDUAL STEERING WHEEL

Application filed January 7, 1932, Serial No. 585,316, and in Belgium October 27, 1931.

My invention relates to improvements in independent steering wheels for vehicles of all types, and more particularly for automobiles, in which each steering wheel is adapted to move vertically in respect of the chassis, and this without influencing the other wheel as is the case when the steering wheels are mounted upon a common shaft; and the main object of my improvement is to provide a device of this type which will be better adapted for practical purposes than those heretofore known.

A preferred form of my invention is illustrated in the accompanying drawing forming part of this specification although my invention may be embodied in various other forms all intended to be covered by the patent to be secured therefor; so long as such forms come within the scope of the claims herein and in which the distinguishing features of my invention are particularly enumerated.

In the drawing the single figure is a view in perspective, partly in section, of an assembly of the improved mechanism according to the invention.

The axle journal $a$ of each wheel $b$ is rigidly connected to a suitably shaped lever arm $c$ which itself is connected to a housing $d$ and arranged, when subjected to the action of elastic means which have a tendency to prevent it from rotating, to describe a pivoting movement about an axis substantially parallel to that of the axle journal; the whole, housing $d$, lever arm $c$, and aforesaid elastic means being connected to the chassis by a cross member $e$, for pivoting movement about a preferably slightly inclined axis corresponding to the pivoting axis of the wheel.

In a preferred embodiment of this assembly I provide at the extremity of the lever arm $c$, opposite that of the axle journal $a$, a shaft $f$ which is supported in bearings provided in housing $d$, and resiliently held against rotary movement by suitably disposed elastic means. These latter, as described in my pending applications Ser. No. 415,510, filed December 20, 1929, and Ser. No. 502,376, filed December 15, 1930, may consist of one or several springs $g$ inserted between housing $d$ and several levers or blades $h$ mounted upon shaft $f$.

Suitable shock absorbing means are provided which may as desired, be independent of, or combined with, the said elastic means. To this effect the housing $d$ is filled with a suitable liquid, such as oil, and the springs $g$ are mounted in telescopic pistons $h^1$ which are provided with suitable orifices to produce a damming effect upon the passage of the oil.

The pivoting connection between housing $d$ and cross bar $e$ is preferably attained in mounting a pivot $i$ in a cylindrical boring of an element $i^1$ rigidly connected to, or forming part of, cross bar $e$. One, or preferably both extremities of pivot $i$ are encased within the housing $d$, or within a suitably shaped extension $j$ thereof comprising two cylindrical elements $j^1$ adapted to receive said extremities. Bearings $j^2$ may be interposed between said cylindrical elements $j^1$ and the pivot $i$ as shown.

The vertical reactions resulting from the weight of the vehicle are counteracted by a ball bearing $k$ which is interposed between the lower element $j^1$ and the central element $i^1$, said ball bearing being supported upon suitably flanged portions provided at the respective extremities of both elements.

The steering tiller is mounted within a universal joint upon the housing; it is to be noted that the mounting of the tiller is considerably facilitated due to the fact that it always moves in one direction only since the housing and consequently the joint of the tiller undergoes no vertical displacement in respect to the chassis of the vehicle.

When steering wheels are supported on oscillatable levers such as $c$, it is found that, in taking curves at high speed, one of the levers moves through a greater angle than the other, the lever on the inside of the curve moving through a greater angle than the one on the outside. If shock absorbing means be not provided, a violent sidewise movement takes place. It is only when blades $h$ react on a shock absorbing assembly, such as $d$ and suspension springs $g$, that the vehicle may be made to maintain an even keel.

Furthermore, it is found that when the brakes are applied, a torque is exerted on levers c tending to rotate them so as to diminish the adherence of the front wheels to the road and causing skidding to take place, especially when the road is wet. By providing shock absorbing means in the steering wheel assembly acting to diminish angular movement of levers c, this danger is avoided.

Obviously the invention is not limited to the structure specifically described herein but may be modified in various ways which will be obvious to those skilled in the art.

What I claim is:—

1. In combination with a vehicle chassis, a suspending and shock-absorbing assembly for front wheels comprising a pivotal support mounted on said chassis and operative to permit lateral oscillations of a steering wheel, a wheel supporting lever provided at its opposite extremities with a wheel supporting spindle and with a horizontal shaft rotatably mounted in said support, suspension means and shock absorbing means mounted on said support reacting on said lever, said shock absorbing means being independent of said suspension means, and a steering wheel supported on said wheel spindle.

2. A structure as defined in claim 1 in combination with a brake assembly mounted on said wheel and said lever.

3. In combination with a vehicle chassis, a suspending and shock-absorbing assembly for front wheels comprising a pivotal support mounted on said chassis and operative to permit lateral oscillations of a steering wheel, a wheel supporting lever provided at its opposite extremities with a wheel supporting spindle and with a horizontal shaft rotatably mounted in said support, suspension means and shock absorbing means mounted on said support reacting on said lever and resisting upward movement of the wheel, said shock absorbing means being independent of said suspension means, and a steering wheel supported on said wheel spindle.

4. In combination with a vehicle chassis, a suspending and shock-absorbing assembly for front wheels comprising a pivotal support mounted on said chassis and operative to permit lateral oscillations of a steering wheel, a wheel supporting lever provided with a wheel supporting spindle and pivoted in said support about an axis spaced from that of said spindle, suspension means cooperating with said lever for resiliently reacting upon the same in any of a plurality of positions of said support about its pivotal axis, shock-absorbing means for resisting rising of said lever concurrently with said suspension means and for dampening the recoil of said suspension means in any of a plurality of positions of said support about its pivotal axis, and a steering wheel mounted on said spindle.

5. In combination with a vehicle chassis, a suspending and shock-absorbing assembly for front wheels comprising a pivotal support mounted on said chassis and operative to permit lateral oscillations of a steering wheel, a wheel supporting lever provided with a wheel supporting spindle and pivoted in said support about an axis spaced from that of said spindle, suspension and shock-absorbing means cooperating with said lever and said pivotal support for resiliently opposing rising of said lever and also opposing rising thereof by a dampening action in any of a plurality of positions of said support about its pivotal axis, and a steering wheel mounted on said spindle.

6. In combination with a vehicle chassis, a suspending and shock-absorbing assembly for front wheels comprising a pivotal support mounted on said chassis and operative to permit lateral oscillation of a steering wheel, a wheel supporting lever provided with a wheel supporting spindle and pivoted in said support about an axis spaced from that of said spindle, suspension and shock absorbing means cooperating with said lever and said pivotal support for resiliently opposing movement of said lever in one direction and simultaneously opposing movement of said lever in said direction by a dampening action in any of a plurality of positions of said support about its pivotal axis, and a steering wheel mounted on said spindle.

7. In combination with a vehicle chassis, a suspending and shock-absorbing assembly for front wheels comprising a pivotal casing mounted on said chassis and operative to permit lateral oscillation of a steering wheel, a wheel supporting lever provided with a wheel supporting spindle, a shaft rotatable with said lever and mounted in said casing about an axis spaced from that of said spindle, spring means cooperating with said shaft and providing resilient suspension means between said casing and said lever, said spring means resisting movement of said lever in one direction with respect to said support, and fluid dampening means in said casing providing further resistance to movement of said lever in said direction.

In testimony whereof I affix my signature.

ANDRÉ DUBONNET.